J. R. GORDON.
LONGITUDINALLY ADJUSTABLE SPACING AND CLAMPING BOLT.
APPLICATION FILED MAR. 14, 1913.
1,100,822.
Patented June 23, 1914.
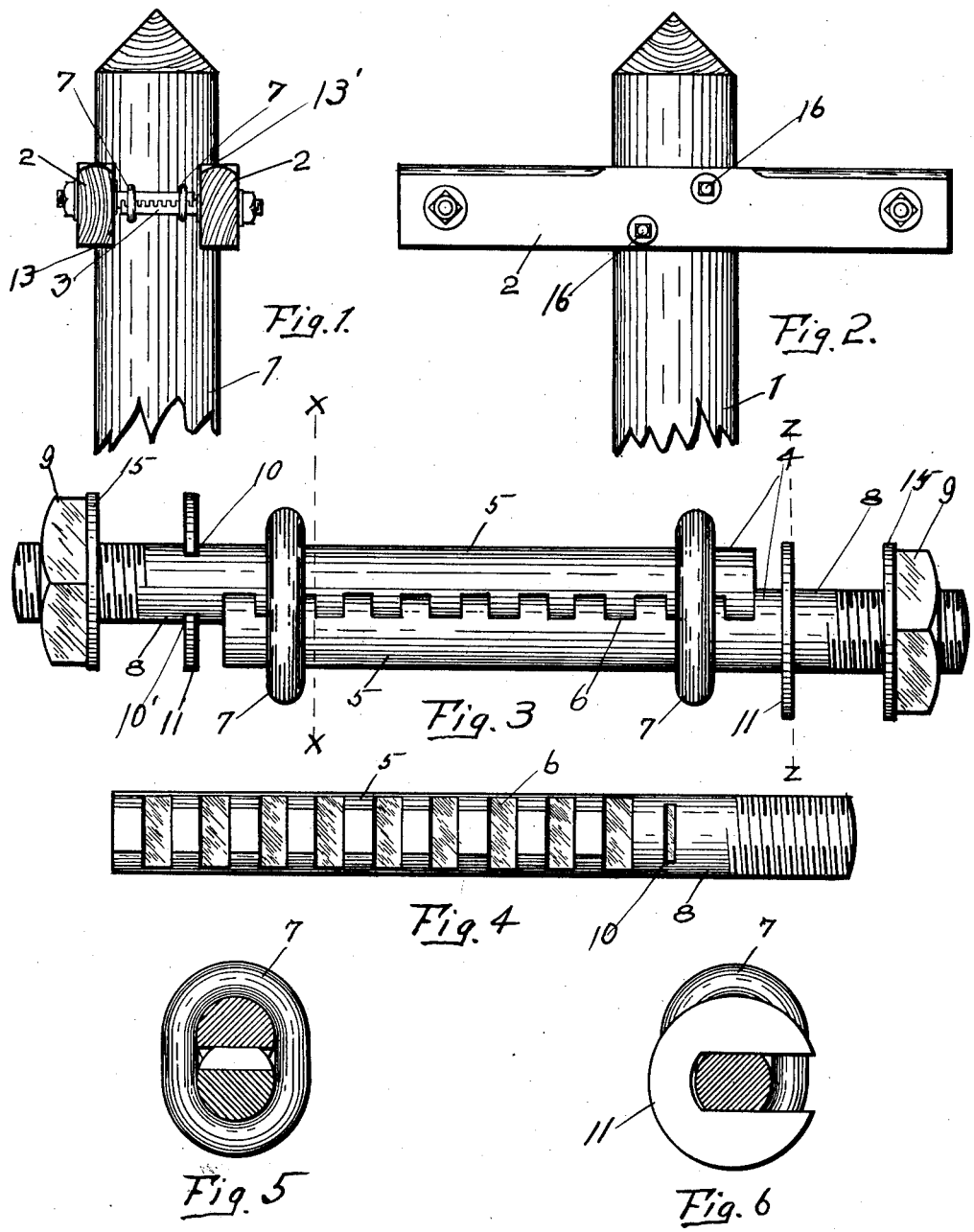

UNITED STATES PATENT OFFICE.

JAMES ROBERTSON GORDON, OF DOWNEY, CALIFORNIA.

LONGITUDINALLY-ADJUSTABLE SPACING AND CLAMPING BOLT.

1,100,822.  Specification of Letters Patent.  Patented June 23, 1914.

Application filed March 14, 1913. Serial No. 754,371.

*To all whom it may concern:*

Be it known that I, JAMES ROBERTSON GORDON, a citizen of the British Empire, residing at Downey, in the county of Los Angeles, State of California, with post-office address as above recited, have invented certain new and useful Improvements in Longitudinally-Adjustable Spacing and Clamping Bolts, of which the following is a specification.

This invention relates to certain new and useful improvements in adjustable bolts for use in securing cross bars to poles and the like, or for securing machinery to its foundation and any other purpose to which a device of this character may prove adaptable.

The invention has for an object to provide a novel form of adjustable spacing bolt adapted to space and securely clamp the cross bars to a pole without the use of lag screws or other fastening means, so as to permit of the easy placement and removal of such cross bars.

Another object of the invention is to provide a device of this character which is simple, efficient and economically constructed and one which may be adjusted for use in connecting and securing the cross bars upon any pole regardless of size.

In the drawings—Figure 1 is an elevation, partly broken away, of a pole showing the cross bars held in position thereon by means of my invention; Fig. 2 is a side elevation of a portion of the pole looking at one side of the cross bar and is calculated to define the position of the bolt when utilized as a clamping device. Fig. 3 is a plan view of my invention detached; Fig. 4 is a detail of one of the main members of the device; Fig. 5 is an elevation of one of the retaining rings, the bolt members being sectioned on line X—X, Fig. 3; Fig. 6 is an elevation of the slotted stop washer and retaining ring, the bolt being sectioned on line Z—Z, Fig. 3.

Like numerals of reference refer to like parts in the several figures of the drawings.

The numeral 1 designates a pole carrying the cross bars 2, which lie in the same horizontal plane, secured or clamped to the pole at a suitable distance from the top thereof by means of the adjustable bolts 3 in a manner later described.

The adjustable bolt 3 consists of two main sections 4 which are identical in construction, so that a description of one will suffice for the other. The section 4, which may be of any desired length, comprises a body portion 5, nearly round in cross section, provided with a serrated face as shown at 6 which is adapted to co-act with the adjacent serrated face of the other section 4 whereby the two sections may be interlocked and held in interlocked relation by means of slidable retaining rings 7 as clearly shown in Figs. 1, 3, 5 and 6. From the body portion 5 extends a shank 8, round in cross-section, which is screw-threaded to receive a nut 9, grooves 10 and 10′ are formed at the junction of the shank 8 and the body portion 5, into which grooves 10 and 10′ a slotted washer 11 is adapted to slide, to form a bearing or stop washer when the bolt is employed as a spacing bolt for the cross bars of poles as later described. Grooves 13 and 13′ are cut transversely of, and near the top of the pole as shown in Fig. 1.

In assembling the parts, the thickness of the pole between the grooves 13 and 13′ in which the cross bars 2 are to be placed is taken into consideration and the body portions 5 of the two sections are adjustably interlocked as aforesaid, so that the distance from the stop washer of one section to the stop washer of the other section is a trifle less than the thickness of the pole at that point, whereupon the protruding shanks 8 of the two sections are inserted through horizontally alining apertures or holes formed in the cross bars as shown in Fig. 1, so that, when the nuts 9 are screwed up on the shanks 8, the cross bars 2 are clamped firmly in position about the pole. Washers 15 are used to bear against the outer face of the cross bar.

The invention presents a simple, efficient and economically constructed form of spacing bolt for use in adjustably clamping the cross bars upon electric light, power, telegraph or telephone poles, obviating the necessity of other fastening means, so as to permit the ready placement and removal of the cross bars. If desired, however, lag screws 16 may be employed to further support the cross-arms 2 upon the pole as shown in Fig. 2.

It is not essential that the poles should be provided with the transverse grooves 13 and 13′, as the cross bars may be securely clamped about the pole without their employment, but I prefer such construction as being more stable.

What I claim is:

1. An adjustable spacing and clamping bolt composed of two counterpart members, each of said members comprising a body portion and a shank portion and a stop washer at the junction of said portions.

2. An adjustable spacing and clamping bolt composed of two counterpart members, each of said members comprising a screw threaded shank portion and a serrated body portion and a detachable stop washer mounted at the junction of, and forming a division wall between said portions.

3. An adjustable spacing and clamping bolt composed of two counterpart members, each of said members comprising a serrated body portion and screw threaded shank portion, transverse grooves at the junction of said portions and a stop washer slidably mounted in said grooves and forming a partition between said body and said shank portions.

4. A longitudinally adjustable spacing and clamping bolt comprising two coacting members adapted to interlock with each other in predetermined positions to determine the length thereof and slidable retaining rings adapted to hold and lock the said members in said predetermined positions.

5. A longitudinally adjustable spacing and clamping bolt comprising two counterpart members provided with means for engaging and interlocking with each other and retaining rings encircling and holding said members in interlocked relation.

6. A longitudinally adjustable spacing and clamping bolt comprising two coacting counterpart members provided with serrated surfaces adapted to engage and interlock with each other and retaining rings for holding said surfaces in interlocked engagement.

7. A longitudinally adjustable spacing and clamping bolt composed of two coacting counterpart members each of said members comprising a body portion and a screw threaded shank portion and a detachable stop washer mounted at the junction of said portions a nut in threaded engagement upon said shank portion and a washer loosely mounted upon said screw threaded shank portion serrated surfaces upon said body portion adapted to engage and coact with its counterpart member in predetermined positions and slidable retaining rings adapted to encircle the said body portions of said counterpart members when in engagement and hold them in interlocked relation.

In testimony whereof I have hereunto set my hand at Los Angeles, California, this 6th day of March, 1913.

JAMES ROBERTSON GORDON.

In presence of—
A. M. HALL,
JOHN W. RUDD.

---

Copies of this patent may be obtained for five cents each, by addressing the "Commissioner of Patents, Washington, D. C."